(12) United States Patent
Kohout et al.

(10) Patent No.: US 8,238,263 B2
(45) Date of Patent: Aug. 7, 2012

(54) NETWORK STATUS DETECTION

(75) Inventors: Rodney Kohout, Brainerd, MN (US); Stanley E. McHann, Jr., Crosslake, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 612 days.

(21) Appl. No.: 12/406,615

(22) Filed: Mar. 18, 2009

(65) Prior Publication Data

US 2010/0238815 A1 Sep. 23, 2010

(51) Int. Cl.
*H04L 1/00* (2006.01)

(52) U.S. Cl. .......................... 370/252; 370/329; 370/431

(58) Field of Classification Search .......................... None
See application file for complete search history.

(56) References Cited

U.S. PATENT DOCUMENTS

| | | | |
|---|---|---|---|
| 6,738,916 B1 * | 5/2004 | Gladden et al. | 713/400 |
| 6,754,473 B1 * | 6/2004 | Choi et al. | 455/101 |
| 2005/0017847 A1 * | 1/2005 | Bonicatto et al. | 340/310.01 |
| 2007/0087756 A1 | 4/2007 | Hoffberg | |
| 2008/0052384 A1 | 2/2008 | Marl et al. | |
| 2008/0165727 A1 | 7/2008 | Xiaoben et al. | |
| 2009/0187358 A1 * | 7/2009 | Deaver, Sr. | 702/58 |
| 2010/0111199 A1 * | 5/2010 | Sharma | 375/257 |

OTHER PUBLICATIONS

International Search Report and the Written Opinion of the International Searching Authority, or the Declaration for PCT/US10/27769 dated May 14, 12010, 12 pages.

* cited by examiner

*Primary Examiner* — Steven H Nguyen
(74) *Attorney, Agent, or Firm* — Crawford Maunu PLLC (57) ABSTRACT

A network status is determined based on channel data specifying at least one channel characteristic of a communications channel. Changes in various channel characteristics are indicative of changes in a status of a distributed network. Therefore, these channel characteristics can be monitored over time to identify changes to the status of the distributed network. Changes to channel characteristics can be identified based on normalized channel data that is normalized relative to reference channel data. Status scores are generated based on the normalized channel data. The status scores are, in turn, normalized for channels that are identified as valid channels. The normalized status scores are adjusted based on variations of the channel data and the network status is identified based on status score variations. Status data identifying the network status is generated based on the status of the network.

3 Claims, 4 Drawing Sheets

NETWORK STATUS DETECTION

BACKGROUND

Service providers utilize distributed networks to provide services to customers over large geographic areas. For example, communications companies utilize a distributed communications network to provide communications services to customers. Similarly, power companies utilize a network of power lines and meters to provide power to customers throughout a geographic region.

These service providers are dependent on proper operation of their respective networks to deliver services to the customers because operational problems in the network can result in lost revenue for the service provider. For example, the service provider may lose revenue based on an inability to provide service during a network outage. Therefore, when a network outage or other network event that disrupts service occurs, it is in the best interest of the service provider to identify the cause of the problem and correct the problem as soon as possible.

In many distributed networks, service providers first receive an indication that there is a problem with the network based on feedback from customers. For example, customers may call the service provider to report a network outage. Based on the information received from the customer, the service provider can take action to remedy the problem with the network. For example, a service provider may access nodes in the network to retrieve additional information regarding the status of the network and/or dispatch workers to attempt to identify the problem.

While a service provider can remedy network outages and other network problems by accessing nodes in the network and/or dispatching workers, the time and resources required to identify the cause of the outage or problem can result in significant loss of revenue for the service provider. Thus, if a service provider can reduce the time required to identify a problem in a network, or even prevent the problem before it occurs, the service provider can reduce lost revenue due to network outages and increase customer satisfaction.

SUMMARY

In general, one aspect of the subject matter described in this specification can be implemented in methods that include the actions accessing channel data that specifies at least one channel characteristic for a communications channel; normalizing the channel data based on reference channel data; generating status scores based on the normalized channel data, the status scores being a vector of values representing the status of the communications channel; normalizing the status scores when the communications channel is in a valid operating state; adjusting the status scores based on variations of the channel data; determining whether a network status has changed based on status score variations; and generating status data based on the determination. Other embodiments of this aspect include corresponding systems, apparatus and computer program products.

These and other implementations can optionally include one or more of the following features. The network can be a power distribution system and the communications channel can be a channel in a power line communications system.

Particular embodiments of the subject matter described in this specification can be implemented so as to realize one or more of the following advantages. The detection of network events can be more reliably detected based on status scores of channels that correspond to status scores for the channels when the network event previously occurred. The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
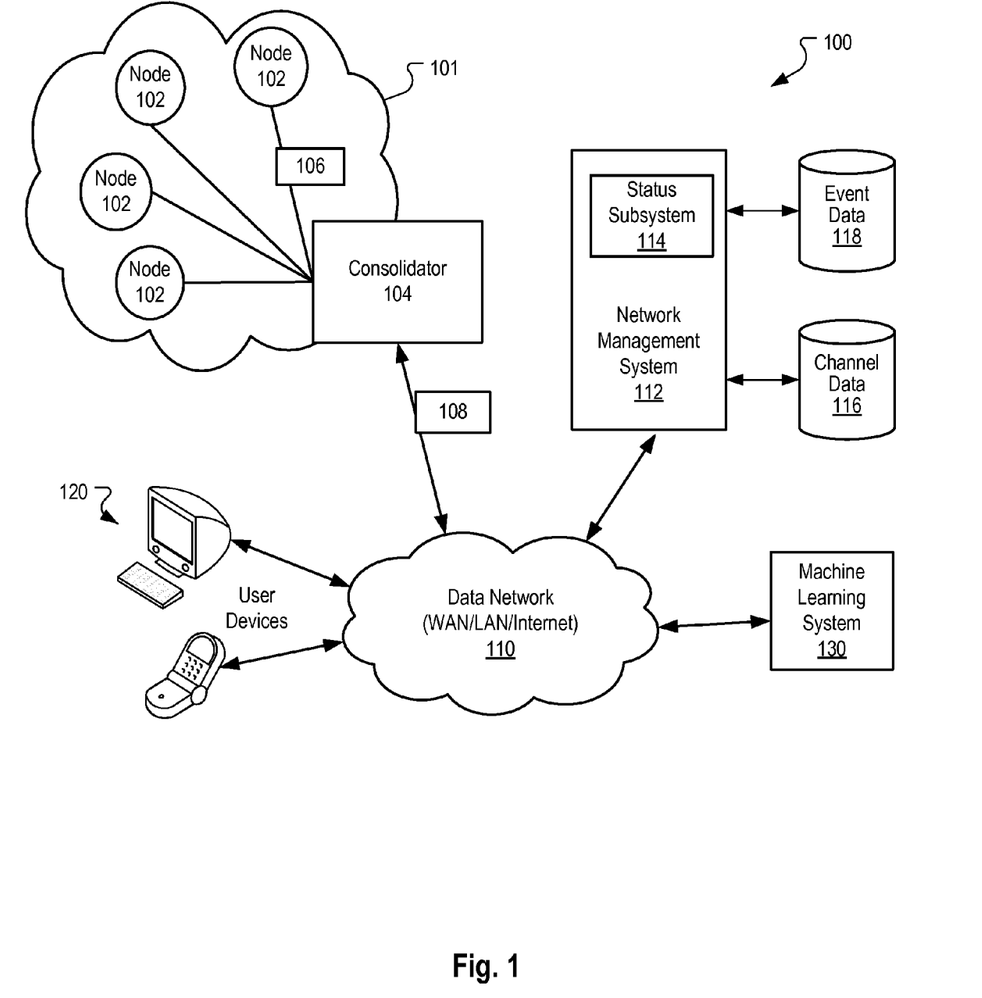
FIG. 1 is a block diagram of an example network environment.

FIG. 1 is a block diagram of an example network environment 100. The network environment 100 includes a distributed network 101 in which a plurality of nodes 102 are coupled to a consolidator 104. The nodes 102 can be any device capable of transmitting information in the network environment 100. For example, the nodes 102 can be meters in a utility network, computing devices, television set top terminals or telephones that transmit data in the distributed network. The description that follows refers to the nodes 102 as meters in a utility network. However, the description is equally applicable to other types of nodes 102 in utility networks or other networks. For example, the description that follows is applicable to gas meters and water meters that are respectively installed in gas and water distribution networks.

The nodes 102 can be implemented to monitor and report various operating characteristics of the distributed network 101. For example, in a power distribution network, meters can monitor characteristics related to power usage in the network. Example characteristics related to power usage in the network include average or total power consumption, power surges, power drops and load changes among other characteristics. In gas and water distribution networks, meters can measure similar characteristics that related to gas and water usage.

The nodes 102 report the operating characteristics of the network over communications channels. Communications channels are portions of radio frequency spectrum over which data are transmitted. The frequency spectrum and bandwidth of each communications channel can depend on the communications system in which they are implemented. For example, communications channels for utility meters (e.g., power, gas and/or water meters) can be implemented in power line communication (PLC) systems and wireless communications systems such as cellular communications systems, wireless broadband networks, wireless mesh networks and other wireless communications systems.

Communications channels for each of these different communications systems have distinct operating parameters that are defined, in part, by communications standards and/or environmental considerations. For example, in a PLC system, operating parameters for communications channels are defined so that the communications channels can operate on the same transmission lines on which power is distributed throughout a power grid. The description that follows refers to communications channels of PLC systems for example purposes. However, the description is equally applicable to communications channels in other communications systems.

In some implementations, the nodes 102 transmit the operating characteristics of the distributed network 101 over communications channels to a consolidator 104. The consolidator 104 is a device or system that consolidates communications from nodes 102 for transmission though a data network 110. For example, the consolidator 104 can receive data bits or data packets 106 from nodes 102 and generates a consolidated packet 108 that includes all or a portion of the data received from the nodes 102. While consolidated packets 108 are discussed for example purposes, the consolidator 104 can retransmit the packets 106 through the data network 110 instead of creating a consolidated packet 108.

The consolidated packets can be generated such that redundant data in the data packets is removed to increase efficiency. Similarly, a consolidator 104 can re-format data received from the nodes 102 for transmission to a device through a data network 110. For example, when multiple nodes 102 are all reporting the same network event (e.g., a service outage), the consolidator can create a consolidated packet that includes a single instance of network event data identifying the network event and include data identifying each node that is reporting the event. Thus, each consolidated packet can include data from many different nodes 102 and transmitted over many different communications channels.

A consolidator 104 can be implemented as a node 102, a repeater, a router or any other computing device that can receive data from nodes 102 and retransmit the data through a network environment 100. In some implementations, a single consolidator 104 can receive data from thousands of nodes 102 and transmit the data through a data network 110.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. While only one consolidator 104 is shown, the distributed network 101 can include many different consolidators 104 to couple many thousands of nodes to the data network 110.

In some implementations, the data network 110 couples the consolidator 104 to a network management system 112. The network management system 112 is a system that monitors and/or controls the distributed network 101. The network management system 112 can control different characteristics of the distributed network 101 based on data received from nodes 102 that are installed in the distributed network 101.

For example, in a PLC network, the network management system 112 can receive a consolidated packet 108 that includes data indicating that power usage is significantly higher in a particular portion of a power network than in other portions of the power network. Based on this data, the network management system 112 can allocate additional resources to that particular portion of the network (i.e., load balance) or provide status data specifying that there is increased power usage in the particular portion of the power network.

The network management system 112 can provide the status data to a user device 120 that can be accessed, for example, by the network operator, maintenance personnel and/or customers. For example, if status data identifying the detected increased usage described above can be provided to a user device 120 accessible by the network operator, who can, in turn, determine an appropriate action regarding the increased usage. Similarly, if the status data indicates that there is a network outage, the network management system 112 can provide data to user devices 120 accessible by customers to provide information regarding the existence of the outage and potentially provide information estimating a duration of the outage.

The network management system 112 can identify network events based on node data that are received from the nodes 102. Node data is data that specifies, in part, node operating characteristics for the node from which the node data is received. Node operating characteristics include a node status indicator, the channel on which the node is communicating, the location of the node, as well as usage information detected by the node. In some situations, these node operating characteristics can be used to determine outage conditions.

For example, power meters in a PLC network the node 102 can provide node data including a status indicator specifying whether the node 102 is detecting a power outage in the portion of the power grid in which the node 102 is located. This status indicator in conjunction with the location of the node can be used by a network operator to determine whether an outage condition exists in a portion of the network.

While this node data can be useful in identifying a service outage or potentially other network events, there are situations in which the node 102 may improperly indicate a service outage or another network event. For example, if a temporary backfeed occurs in a portion of a power grid, the nodes 102 in that portion of the grid may improperly characterize the backfeed as a power outage. In turn, the network operator may deploy a maintenance crew to identify the cause of an outage that does not exist. To reduce the likelihood that a network operator inefficiently allocates resources based on false indication of a network event, channel data can be used to identify the status of a distributed network.

In some implementations, the network management system 112 includes a status subsystem 114 that can identify the status of the distributed network 101 based on channel data. Channel data is data that specifies at least one channel operating characteristic ("channel characteristic") for the communications channel over which node data is transmitted. The channel data can be accessed or detected, for example, by the consolidator 104, network management system 112 or the status subsystem 114. The channel data can be indexed in a channel data store 116 that is coupled to the network management system 112, status subsystem 114 and/or consolidator 104 either directly or over the data network 110.

The channel characteristics for a channel can include RF characteristics of the channel as well as data integrity characteristics of the node data that are transmitted over the channel. In some implementations, the RF characteristics of a channel includes an average noise floor of the channel (e.g., measured over a 12 or 24 hour period) and a relative magnitude of signals (e.g., Signal to Noise measures) being transmitted over the communications channel. The data integrity characteristics for each channel can include data identifying whether the node data transmitted over the channel is being logged by the consolidator 104, network management system 112 and/or status subsystem 114. The data integrity characteristics can also include data identifying whether the node data are valid data. For example, a packet of node data can include redundant data bits that can be checked to verify the integrity of the packet.

The status subsystem 114 generates values that represent the status of the distributed network 101 based on the channel data. These values are referred to as status scores. The status scores for a channel can be represented as a vector of scores, where each score in the vector is generated based on a distinct set of channel characteristics for the channel. For example, each status score can be generated based on a function of the relative magnitude of signals being transmitted over the channel and at least one other channel characteristic. The function can be, for example, a weighted sum, weighted difference, or weighted ratio of the channel characteristics.

The status subsystem 114 normalizes the status scores and monitors variations of the status scores over time. If the status score variations satisfy a threshold, the value of the status score can be adjusted accordingly. These status score variations are compared to reference status score variations (e.g., identified from historical channel data) that correspond to an identified network status to determine the operating status of the distributed network 101. For example, if the status score variations for each channel are similar to a sequence of reference status score variations that correspond to a network outage, then the status subsystem 114 can generate status data indicating an outage in the distributed network 101.

In some implementations, the status subsystem 114, channel data store 116 and event data store 118 can be implemented in the consolidator 104 such that the network management system 112 can be coupled to the status subsystem 114 and channel data store over the data network 110.

Figure 2:
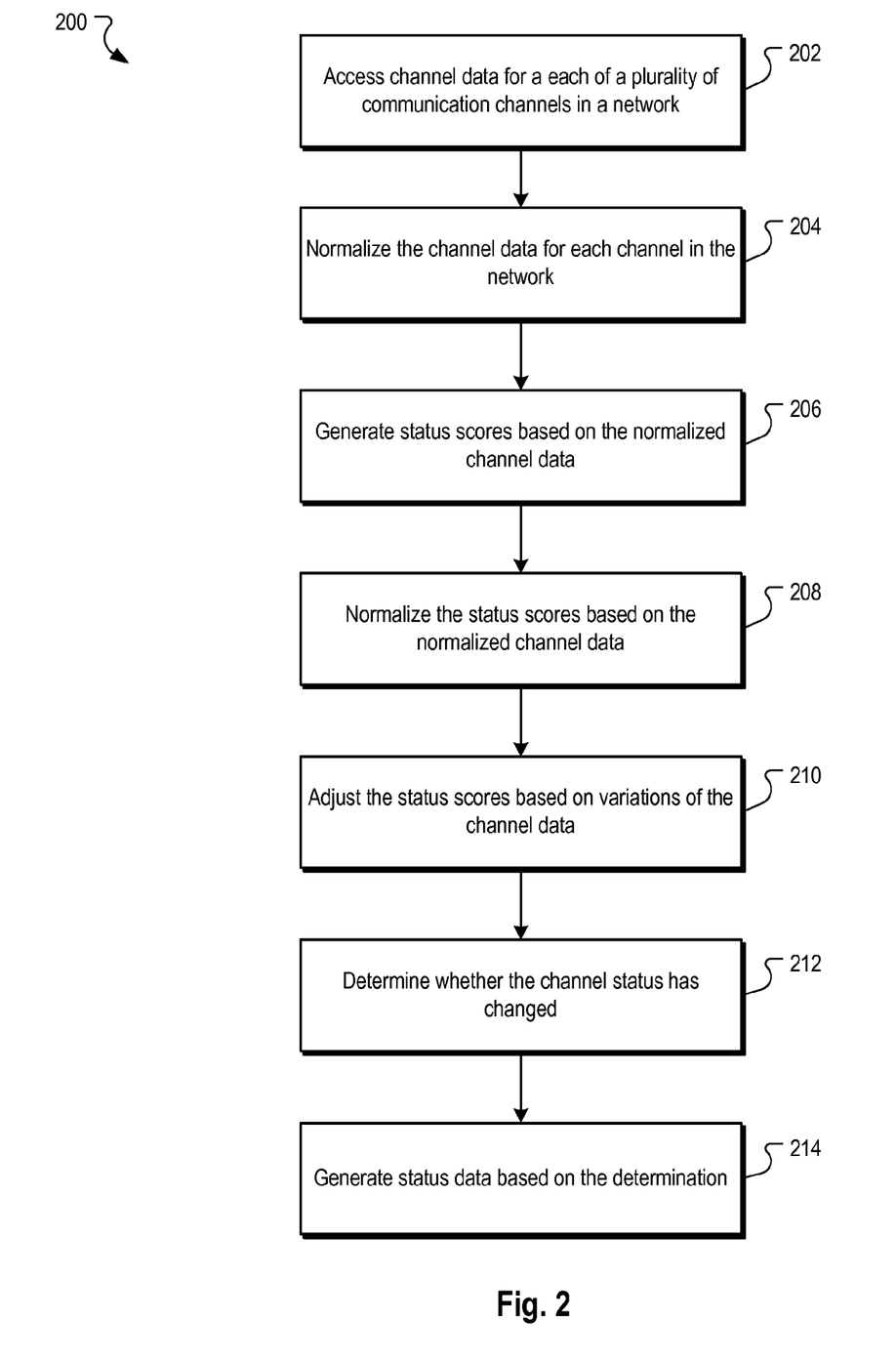
FIG. 2 is a flow chart of an example process for determining an operating status of a network.

FIG. 2 is a flow chart of an example process 200 for determining an operating status of a network. The process 200 can be implemented, for example, by the status subsystem 114.

Channel data is accessed for each of a plurality of communications channels in a network (202). As discussed above, the channel data specifies channel operating characteristics for a channel over which node data is transmitted. The channel data can be accessed, for example, from a channel data store 116 in which the channel data is logged and/indexed. Alternatively, the channel data can be detected from the channel over which the node data is accessed. For example, the RF and data integrity characteristics of the channel can be detected by the consolidator 104 and provided to the network management system 112 over the data network 110.

The channel data is normalized for each communications channel (204). In some implementations, the channel data is normalized based on reference channel data. As discussed above, each communications channel for the network generally is an independent portion of RF spectrum. Therefore, it is likely that the RF characteristics for each of the channels is going to vary due to environmental conditions and other network events (e.g., load variations or impedance mismatches) that affect different portions of the spectrum differently.

For example, the average noise floor for each channel and relative magnitude of signals transmitted on each channel may vary significantly due to load variations throughout the distributed network 101. The relative magnitude of the signals can be determined using an average noise floor for the channel as a reference magnitude. Significant differences between the RF characteristics of the different channels can make it difficult to compare RF characteristics of one channel to the RF characteristics of another channel and in turn, previously logged channel data. Generating normalized values for the channel characteristics for each communications channel can facilitate direct comparison of characteristics for each communications channel as well as facilitate more accurate detection of changes to the status of the distributed network 101, for example, by mapping the channel data to discrete categories.

In some implementations, channel data for each channel characteristic can be normalized relative to reference channel characteristic values. The reference channel characteristic values are values that have been identified as being indicative of a channel characteristic status. These values can be specified by a network operator or learned using a machine learning system 130 that implements a machine learning algorithm. The machine learning system 130 is presented as an independent element, but can be implemented, for example, in the consolidator 104.

For example, a machine learning system 130 may define categories in which channels can be categorized based on the signal to noise measures for the channel relative to reference signal to noise measures. The machine learning system 130 may define an "excellent" signal to noise measure for a channel as signal to noise measure that is above a first signal to noise threshold. Similarly, the machine learning system 130 may define a "bad" signal to noise measure as a signal to noise measure that is below a second signal to noise threshold. The machine learning system 130 may further define a "good" signal to noise measure as being a signal to noise measure having a magnitude that is between the first and second thresholds. Each of the categories can have a corresponding scaling factor, default value or other normalization factor.

A current signal to noise measure for a channel can be compared to each signal to noise measure threshold and categorized based on whether the current signal to noise measure is higher than the thresholds. In turn, the signal to noise measure for the channel can be normalized based on the normalization factor corresponding to the category by which the signal to noise measure for the channel is categorized.

Other channel characteristics for the channels can be normalized in a manner similar to that described above. While a particular normalization routine has been described, other normalization routines can be implemented. For example, a default value can be assigned for the channel characteristic for each channel as the normalized value of the operating characteristic for the channel. The reference channel characteristics can be identified globally for all channels in the network or independently for each channel in the network.

Status scores are generated for each communications channels (206). In some implementations, the status scores are generated based on the normalized channel data. For example, each status score can be generated based on a function of a relative magnitude measure for signals being transmitted over the channel and a value for at least one other channel characteristic. The function can be, for example, a weighted sum, weighted difference, or weighted ratio of the channel characteristics.

The status scores for each channel define a channel vector having values representing the status of the channel based on the channel characteristics. Each value of the channel vector can be a status score generated based on the normalized channel data for the channel characteristics. For example, a channel vector can include status scores corresponding to values generated based on a function of the relative magnitude measure for signals being transmitted over the channel and each of a value associated with node data transmitted over the channel being logged, and the node data being valid.

For clarity, the channel vectors are described as being organized in a three dimensional matrix. The three dimensional matrix can have a first axis representing each channel in the network, a second axis representing various data integrity characteristics related to the node data and a third axis representing the signal to noise measures of the channels. The data integrity characteristics can include, for example, a value representing whether node data transmitted on the channel is being logged and whether the node data is valid. When node data is not being logged on a channel, or node data being logged on a channel is not valid, these events can be indicative of a network event such as a network outage. Therefore, monitoring these and other data integrity characteristics can facilitate identification of a network event.

In some situations, the average noise floor of the channels can also be represented on the second axis so that a status scores based on a function of the signal to noise measures and average noise floors of the channels can be represented in the matrix. As discussed above, network events can cause changes to the average noise floor for a channel. Thus, monitoring the average noise floor can also facilitate identification of a network event.

Status scores for each valid channel are normalized (208). In some implementations, a channel is a valid channel if the channel is considered to be in a "normal" operating condition. For example, a channel can be considered to be in a normal operating condition when the signal to noise measure associated with the channel satisfies a threshold signal to noise measure, node data transmitted over the channel is being logged, the channel is in a permanent state (e.g., in the same state for a minimum period of time) and the node data being transmitted over the channel is valid data.

For each channel that is identified as being a valid channel, the status scores for the channel are set to a default value. In some implementations, the default value is zero. Setting the status scores of valid channels to zero provides a common baseline status score for each valid channel against which variations to the channel characteristics can be compared and facilitates identification of binary patterns of status scores based on status score variations. Channels that are not identified as valid channels can be ignored until the channels are identified as valid channels.

The status scores for each of the channels vary in response to variations in the channel characteristics. For example, the signal to noise measure for a particular channel may vary significantly over time. This change in signal to noise measure may be caused by a change in the noise floor and/or a change in the absolute amplitude of the signal.

A change in the noise floor can be caused by different network events than a change in the absolute amplitude of the signal and each of these different events may have a different relative importance with respect to the status of the network. Therefore, the relative importance of a change in the absolute signal level can have a different relevant importance to determining the status of the network than a change in the noise floor. Thus, values for each of the channel characteristics can be scaled a weight that is indicative of the importance of the channel characteristic in determining the status of a distributed network.

For example, variations in the signal to noise measure for a channel may be the most significant factor in determining whether a service outage has occurred. Therefore, in this example, the weight by which variations in the signal to noise measure are scaled may be higher than weights by which other channel characteristics are scaled. The relative importance of a channel characteristic for determining the status of the network can be determined, for example, using a back propagation algorithm that determines the weights corresponding to each of the channel characteristics based on error derivatives of the weights that result from changes to the weights.

Status scores are adjusted based on variations of the channel data (210). As channel characteristics for each channel changes, the status scores associated with the channel will also vary. Channel characteristic variations are scaled by the weights that correspond to each of the channel characteristics such that the status score will vary in proportion to the weighted variations. The status score variations are monitored and compared to variation thresholds. If the status score variations exceed the variation threshold, the value of the status score can be changed in the status score matrix. For example, when a status score generated for a channel based on the signal to noise measure and a valid/invalid data determination for the channel exceed the variation threshold, the status score corresponding to the intersection of these channel characteristics in the matrix can be adjusted (e.g., set to 1).

A determination is made whether a network status has changed based on variations of the status scores (212). In some implementations, a binary pattern of status scores can be compared to reference binary patterns of status scores to determine the status of a channel. For example, if a service outage is associated with a binary status score pattern, an outage status for the channel can be determined when the binary status score pattern for the channel matches the binary status score pattern. In turn, a change in the status of the channel can be indicative of a change in the status of a portion of the distributed network corresponding to the channel. Thus, a change in the status of a channel and, in turn, a change in status of a portion of the distributed network can be determined based on variations to the status scores.

Because signal variations occur over time and over many channels, a sequence of status score changes in the matrix identified over multiple time periods can be compared to a sequence of reference status score changes to determine whether a network event has occurred. For example, if a three period sequence of status score changes occurring over multiple channels is identified as matching a three period sequence of reference status scores over multiple channels, the network event associated with the three period sequence of reference status scores can be determined to have occurred in the network.

In some implementations, network events of interest (e.g., network outages and restorations) can be associated with a sequence of status score changes based on the network event occurring during the sequence of status scores. For example, a sequence of status scores can be generated based on channel data that is logged during the time period in which the network event was identified as occurring can be associated with the network event. In turn, the sequence of status scores can be stored in an event data store 118 and indexed as a reference sequence of status scores for the event that occurred during the time period in which the channel data was logged.

In some implementations, the reference sequences of status scores for each network event can be provided to a machine learning algorithm to determine relationships between the channel characteristics and the network events. In turn, the relationships between channel characteristics can be used to train the machine learning algorithm to identify network events based on changes to status scores of channels in the network. The machine learning algorithm can be implemented, for example, according to a support vector machine, support vector regression or other supervised or semi-supervised learning algorithm.

In some implementations, the status of a distributed network can be continually monitored by continually comparing sequences of status scores associated with channels of the distributed network to the reference sequences of status scores that are indexed in the event data store 118.

For example, the status scores for channels of a distributed network can be sampled at periodic intervals thereby providing a current status score matrix. The current status score matrix and a number N of previous periodic samples of the matrix can define an N+1 sequence of status scores. The N+1 sequence of status scores can be compared to N+1 reference sequences of status scores to determine the status of the network based on a match being identified between the N+1 sequence and an N+1 reference sequence associated with a network event.

When a match is identified, the N+1 sequence of status scores that matched the reference sequence of status scores can be defined as a reference sequence for the network event. In turn, the new sequence of status scores can be provided to the machine learning algorithm so that more complex relationships can be identified between the channel characteristics and the status of the distributed network. These identified relationships can be used, for example, to update the weights associated with each channel characteristics.

Status data is generated based on the network status (214). In some implementations, the status data can be data identifying the status of the distributed network. The status data can be provided to a user device that is accessible by the network operator, maintenance personnel, or customers. The status data can include data identifying a network event that corresponds to the status of the network, an estimated time to remedy the event and/or recommended actions that should be taken to place the network back in a normal operating mode.

Figure 3:
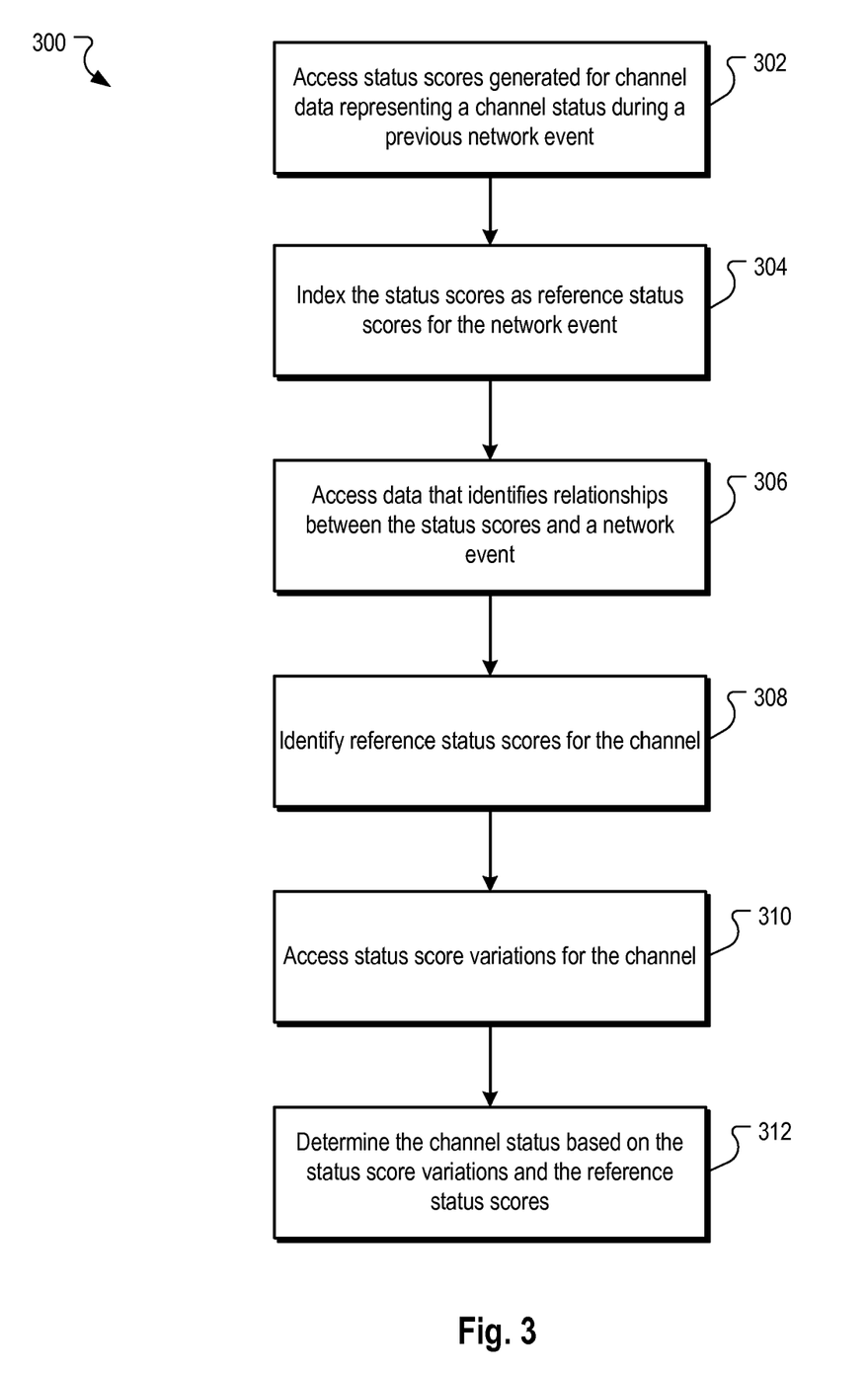
FIG. 3 is a flow chart of an example process for determining whether a network status has changed.

FIG. 3 is a flow chart of an example process 300 for determining whether a network status has changed. The process 300 can be implemented, for example, by the status subsystem 114.

Status scores generated for channel data representing a channel status during a previous network event are accessed (302). In some implementations, the status scores can be binary vectors generated based on variations to the status score during the previous network event. For example, a weighted variation of a status score during the network event that satisfies a status score variation can be represented by a status score having the value 1. Weighted variations of status scores during the network event that do not satisfy the status score threshold can be represented by a status score having the value 0. The status scores can be accessed, for example, from the channel data store 116 and/or the event data store 118.

Status scores are indexed as reference status scores for the network event (304). Status scores that are generated during the network event are indicative of the status of channels during the network event. Therefore, the status scores that are generated for the channels can be used as reference scores to identify existence of the network event. The status scores can be indexed, for example, in the event data store 118.

Data that identifies relationships between the status scores and a network event are accessed (306). In some implementations, the relationships between the status scores and the network event can be status score variations that are indicative of the network event. For example, a particular binary status score pattern can be indicative of a network outage. Therefore, identification of these relationships can facilitate more accurate identification of network events. The data that identifies the relationships between the status scores and the network event can be generated by a machine learning system 130 and stored, for example, in the event data store 118. The data identifying the relationships can be accessed, for example, from the event data store.

Reference status scores are identified for the channel (308). In some implementations, the reference scores for each channel can be identified by accessing the reference status scores that are indexed in the event data store 118.

Status score variations are accessed for the channel (310). In some implementations, the status score variations are the changes in the status score relative to the normalized status scores. The status score variations can be accessed from the consolidator 104 and/or the channel data store 116.

The network status is determined based on the status score variations and the reference status scores (312). In some implementations, network status is determined according to the data that identifies the relationships between the status scores and the reference status scores. For example, the data identifying the relationships may indicate that particular binary patterns are indicative of the status. In turn, the relationships may also indicate that the status score patterns over particular channels are indicative of a network status and/or a channel status. Therefore, the channel status for each channel, and, in turn, the status of the network can be determined based on the status scores of the channels and the reference status scores.

Figure 4:
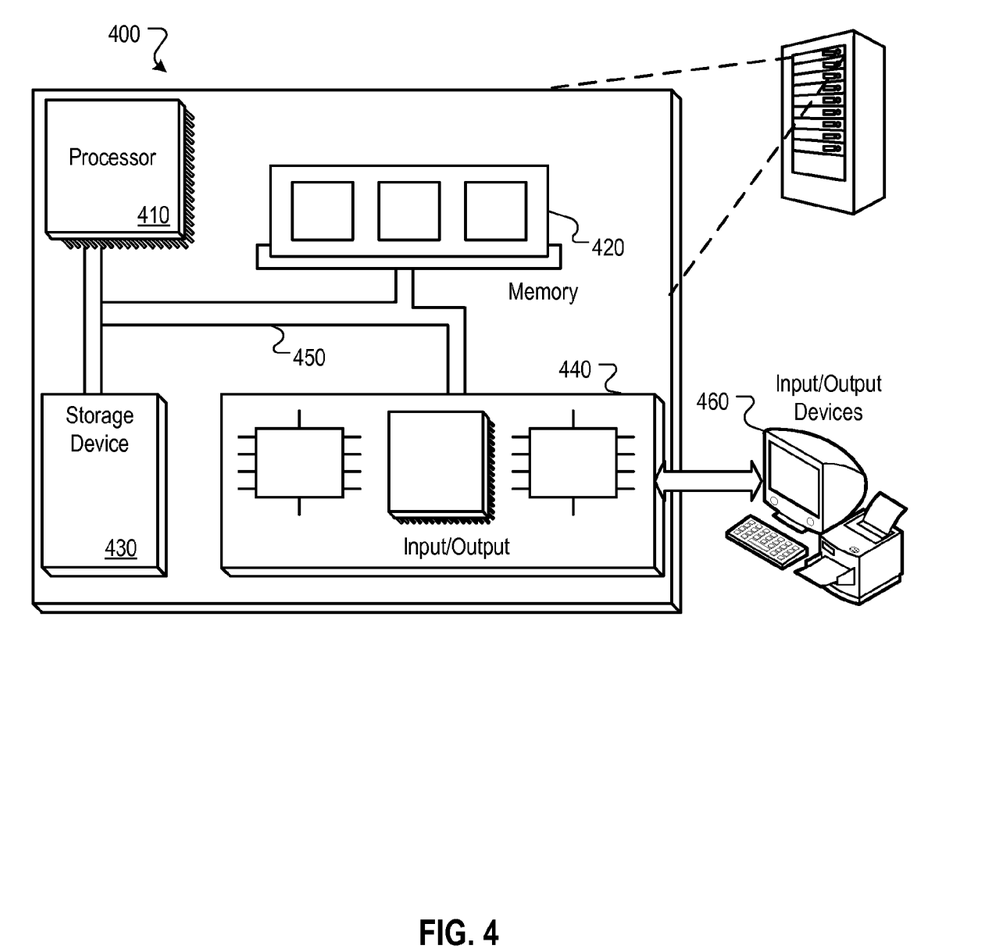
FIG. 4 is a block diagram of an example computer system that can be used to determine a network status.

FIG. 4 is block diagram of an example computer system 400 that can be used determine a network status, as described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

The status subsystem 114 and/or network management system 112 can be realized by instructions that upon execution cause one or more processing devices to carry out the processes and functions described above. Such instructions can comprise, for example, interpreted instructions, executable code, or other instructions stored in a computer readable medium. The status subsystem 114 and/or network management system 112 can be distributively implemented over a network, such as a server farm, or can be implemented in a single computer device.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system," "processing devices" and "subsystem" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   for each of a plurality of communications channels arranged to convey data in a network, using one or more processors configured and arranged for:
   accessing channel data that specifies at least one channel characteristic for the communications channel;
   normalizing the channel data based on reference channel data;
   generating status scores based on the normalized channel data, the status scores being a vector of values representing the status of the communications channel;
   normalizing the status scores for each communications channel that is in a valid operating state;
   adjusting the status scores based on variations of the channel data; and
   determining whether a network status has changed based on status score variations at least in part including identifying reference status scores for the channel, the reference status scores corresponding to a network event, and including determining that the network status has changed when the status score variations are indicative of the network event based on the reference status scores; and
   generating status data based on the determination;
   accessing status scores generated for channel data representing a channel status during a previous network event;
   indexing the status scores as reference status scores for the network event;
   accessing data that identifies relationships between the reference status scores and the network event; and
   determining a network status based on the status score variations and the reference status scores according to the data identifying relationships between the reference status scores and the network event.

2. The method of claim 1, wherein the status scores comprise a sequence of status scores that representing a channel status over two or more time periods.

3. A system, comprising:
   a network management system comprising one or more processors to receive channel data and event data for a plurality of communications channels of a network, the channel data specifying at least one channel characteristic for each of the plurality of channels, the event data specifying one or more network events;

a data store coupled to the network management system to store the channel data and event data;

a status subsystem coupled to the network management system and the data store, the status subsystem operable to determine a distributed network status based on status score variations for each of the plurality of channels, the status score variations being based on normalized status scores for the channels and reference status scores associated with a network event, wherein the status subsystem is further operable to access data that identifies relationships between status scores and a network event and determine a network status based on the status score variations and the reference status scores.

* * * * *